United States Patent
Ionescu et al.

(10) Patent No.: US 11,945,726 B2
(45) Date of Patent: Apr. 2, 2024

(54) POROUS SILICON MATERIAL AND METHOD OF MANUFACTURE

(71) Applicant: ionobell, Inc., San Jose, CA (US)

(72) Inventors: Robert C. Ionescu, San Jose, CA (US); Chueh Liu, San Jose, CA (US)

(73) Assignee: ionobell, Inc., San Jose, CA (US)

( * ) Notice: Subject to any disclaimer, the term of this patent is extended or adjusted under 35 U.S.C. 154(b) by 0 days.

(21) Appl. No.: 18/080,497

(22) Filed: Dec. 13, 2022

(65) Prior Publication Data

US 2023/0183076 A1 Jun. 15, 2023

Related U.S. Application Data

(60) Provisional application No. 63/288,831, filed on Dec. 13, 2021.

(51) Int. Cl.
| | |
|---|---|
| C01B 33/025 | (2006.01) |
| B22F 9/04 | (2006.01) |
| C23F 1/44 | (2006.01) |
| H01M 4/38 | (2006.01) |
| B82Y 30/00 | (2011.01) |

(52) U.S. Cl.
CPC ............. *C01B 33/025* (2013.01); *B22F 9/04* (2013.01); *C23F 1/44* (2013.01); *H01M 4/386* (2013.01); *B22F 2009/043* (2013.01); *B82Y 30/00* (2013.01); *C01P 2004/61* (2013.01); *C01P 2006/16* (2013.01)

(58) Field of Classification Search
None
See application file for complete search history.

(56) References Cited

U.S. PATENT DOCUMENTS

| | | | |
|---|---|---|---|
| 6,060,680 | A | 5/2000 | Turner et al. |
| 7,087,346 | B2 | 8/2006 | Barker et al. |
| 7,097,939 | B2 | 8/2006 | Ferreira et al. |
| 8,012,676 | B2 | 9/2011 | Yoshiki et al. |
| 9,666,855 | B2 | 5/2017 | Voillequin et al. |
| 9,748,573 | B2 | 8/2017 | Yang et al. |
| 9,765,271 | B2 | 9/2017 | Myrick |

(Continued)

FOREIGN PATENT DOCUMENTS

| | | |
|---|---|---|
| CN | 104300125 A | 1/2015 |
| CN | 110828774 A | 2/2020 |

(Continued)

OTHER PUBLICATIONS

The entry "etchant" in "dictionary.com", printed on Aug. 15, 2023. (Year: 2023).*

(Continued)

*Primary Examiner* — Jiong-Ping Lu
(74) *Attorney, Agent, or Firm* — Jeffrey Schox; Randy Mehlenbacher

(57) ABSTRACT

A method for forming a porous silicon material can include forming a mixture of silicon, carbon, and an etchant element, solidifying the mixture, removing the etchant element to form pores within the silicon material. The porous silicon material can include a distribution of pores with an average pore diameter between about 10 nm and 500 nm, wherein the silicon particle comprises a silicon carbon composite comprising 1-5% carbon by mass, 1-5% oxygen by mass, and 90-98% silicon by mass.

7 Claims, 6 Drawing Sheets

(56) References Cited

U.S. PATENT DOCUMENTS

| | | | |
|---|---|---|---|
| 10,147,950 | B2 | 12/2018 | Sakshaug et al. |
| 10,263,249 | B2 | 4/2019 | Kim et al. |
| 10,601,037 | B2 | 3/2020 | Xia et al. |
| 10,608,254 | B2 | 3/2020 | Sakshaug et al. |
| 10,658,659 | B1 | 5/2020 | Mason et al. |
| 10,756,330 | B2 | 8/2020 | Wang et al. |
| 10,763,501 | B2 | 9/2020 | Feaver et al. |
| 10,777,807 | B2 | 9/2020 | Haufe |
| 10,784,512 | B2 | 9/2020 | Sakshaug et al. |
| 10,923,722 | B2 | 2/2021 | Sakshaug et al. |
| 10,978,733 | B2 | 4/2021 | Wegener et al. |
| 11,066,305 | B1 | 7/2021 | Ionescu et al. |
| 11,133,493 | B2 | 9/2021 | Sonntag et al. |
| 11,437,621 | B2 | 9/2022 | Sakshaug et al. |
| 11,591,478 | B2 | 2/2023 | Ionescu et al. |
| 2005/0136330 | A1 | 6/2005 | Mao et al. |
| 2008/0299455 | A1 | 12/2008 | Shiozaki et al. |
| 2010/0133111 | A1 | 6/2010 | Nocera et al. |
| 2011/0052475 | A1 | 3/2011 | Barati et al. |
| 2012/0244436 | A1 | 9/2012 | Kerlau |
| 2012/0315538 | A1 | 12/2012 | Chiang et al. |
| 2013/0115512 | A1 | 5/2013 | Jiang et al. |
| 2013/0189579 | A1 | 7/2013 | Darby et al. |
| 2014/0272573 | A1 | 9/2014 | Xiao et al. |
| 2015/0099187 | A1 | 4/2015 | Cui et al. |
| 2015/0155538 | A1 | 6/2015 | Tang et al. |
| 2015/0321147 | A1 | 11/2015 | Fleming et al. |
| 2016/0308205 | A1 | 10/2016 | Canham et al. |
| 2017/0194631 | A1 | 7/2017 | Favors et al. |
| 2018/0013137 | A1 | 1/2018 | Put et al. |
| 2018/0083272 | A1 | 3/2018 | Son et al. |
| 2018/0097229 | A1 | 4/2018 | Jo et al. |
| 2018/0309095 | A1 | 10/2018 | Olchawski et al. |
| 2018/0342757 | A1 | 11/2018 | Choi et al. |
| 2019/0097222 | A1 | 3/2019 | Feaver et al. |
| 2019/0140258 | A1 | 5/2019 | Burshtain et al. |
| 2019/0181440 | A1 | 6/2019 | Park et al. |
| 2019/0252685 | A1 | 8/2019 | Abusleme et al. |
| 2019/0267617 | A1 | 8/2019 | Evans et al. |
| 2019/0280298 | A1 | 9/2019 | Sakshaug et al. |
| 2019/0326593 | A1 | 10/2019 | Ozkan et al. |
| 2020/0020935 | A1 | 1/2020 | Costantino et al. |
| 2020/0044241 | A1 | 2/2020 | Gigler et al. |
| 2020/0194749 | A1 | 6/2020 | Ogata et al. |
| 2020/0313175 | A1 | 10/2020 | Shin et al. |
| 2020/0313193 | A1 | 10/2020 | Shin et al. |
| 2020/0335826 | A1 | 10/2020 | Collins et al. |
| 2020/0358100 | A1 | 11/2020 | Duong et al. |
| 2020/0388846 | A1 | 12/2020 | Kim et al. |
| 2021/0057736 | A1 | 2/2021 | Feaver et al. |
| 2021/0075055 | A1 | 3/2021 | Duong et al. |
| 2021/0114886 | A1 | 4/2021 | Rohani et al. |
| 2021/0143439 | A1 | 5/2021 | Kim et al. |
| 2021/0175498 | A1 | 6/2021 | Feaver et al. |
| 2021/0234173 | A1 | 7/2021 | Wang et al. |
| 2021/0257621 | A1 | 8/2021 | Spreafico et al. |
| 2021/0320320 | A1 | 10/2021 | Yushin et al. |
| 2021/0344003 | A1 | 11/2021 | Yushin et al. |

FOREIGN PATENT DOCUMENTS

| | | | | |
|---|---|---|---|---|
| DE | 102016221782 | A1 | 5/2018 | |
| DE | 102019213584 | A1 | 3/2021 | |
| DE | 102019213585 | A1 | 3/2021 | |
| TW | 201926779 | A | 7/2019 | |
| WO | 2022220685 | A1 | 10/2022 | |
| WO | WO2022220685 | * | 10/2022 | ............ C01B 33/02 |

OTHER PUBLICATIONS

Campbell, Brennan, et al., "Carbon-Coated, Diatomite-Derived Nanosilicon as a High Rate Capable Li-ion Battery Anode", Scientific Reports, 6: 33050, Oct. 7, 2016, 9 pages.

Evonik, Aerosil—Fumed Silica—Technical Overview, 104 pages, downloaded Feb. 17, 2021.

Abboud, Jaafar, et al., "Developing of nano sized fibrous eutectic silicon in hypereutectic Al—Si alloy by laser remelting", Scientific Reports, (2020) 10:12090.

Andersen, Hanne Flaten, et al., "Silicon-Carbon composite anodes from industrial battery grade silicon", Scientific Reports (2019) 9:14814.

Bai, Yangzhi, et al., "A high-performance silicon/carbon composite as anode materials for lithium ion batteries", Nano Express 2(2021) 01021.

Ball, Philip, "Silicon seduced from silica: Synthetic silicon could be cheaper and more delicate", Nature, May 19, 2003, 2 pages.

Barbehenn, George H., et al., "Battery Conditioner Extends the Life of Li-Ion Batteries", Linear Technology Magazine, Dec. 2009, pp. 29-30.

Bux, Sabah, et al., "Nanostructured Bulk Silicon as an Effective Thermoelectric Material", Adv. Func. Mater. 2009, 19, 2445-2452.

Campbell, Brennan, et al., "Carbon-Coated, Diatomite-Derived Nanosilicon as a High Rate Capable Li-ion Battery Anode", Scientifc Reports, 6: 33050, 9 pages, year 2016.

Choi, Insoo, et al., "Fading mechanisms of carbon-coated and disproportionated Is/SIOx negative electrode (SI/SiOx/C) in Li-ion secondary batteries: Dynamics and component analysis by TEM", Electrochimica Acta 85 (2012) 369-376.

Dai, Fang, et al., "Minimized Volume Expansion in Hierarchical Porous Silicon upon Lithiation", ACS Appl. Mater. Interfaces 2019, 11, pp. 13257-13263.

Darghouth, A., et al., "High Purity Porous Silicon Powder Synthesis by Magnesiothermic Reuction of Tunisina Silica Sand", Silicon, Research Gate, Apr. 2020, 11 pages.

Favors, Zachary, "Scalable Synthesis of Nano-Silicon from Beach San for Long Cycle Life Li-ion Batteries", Scientific Reports, 4: 5623, 7 pages, published Jul. 8, 2014.

Favors, Zachary, et al., "Towards Scalable Binderless Electrodes: Carbon Coated Silicon Nanofiber Paper via Mg Reduction of Electrospun SiO2 Nanofibers", Scientific Reports, 5: 8246, 7 pages, published Feb. 6, 2015.

Gauthier, Magali, et al., "A low-cost and high performance ball-milled S-based negative electrode for high energy Li-ion batteries", Energy Environ. Sci., 2013, 6, 2145-2155.

Gauthier, Magali, et al., "From SI-wafers to cheap and efficient Is electrodes for Li-ion batteries", Journal of Power Sources 256 (2014) 32-36.

Haregerwoin, Atetegeb Meazah, et al., "Electrolyte additives for lithium ion battery electrodes: progress and perspectives", The Royal Society of Chemistry 2016, Energy Environ. Sci. 2016, 9, 1955-1988.

Hossain, M.R., et al., "Probing the surfaces of core-shell and hollow nanoparticles by solvent relaxation NMR", MRC, vol. 56, Issue 4, Apr. 2018, pp. 251-256.

Hyung, Yoo E., et al., "Flame-retardant additives for lithium-ion batteries", Journal of Power Sources 119-121 (2003) 383-387.

Jang, Hee Dong, et al., "Aerosol-Assisted Extraction of Silicon Nanoparticles from Wafer Slicing Waste for Lithium Ion Batteries", Scientific Reports, 5 : 9431, Mar. 30, 2015.

Jia, Haiping, et al., "A novel approach to synthesize micrometer-sized porous silicon as a high performance anode for lithium-ion batteries", Nano Energy 50 (2018) pp. 589-597.

Kang, M., et al., "Intrinsically conductive polymer binders for electrochemical capacitor application", The Royal Society of Chemistry 2014, 4, 27939-27945.

Kim, Sang Woo, et al., "Current Collectors for Flexible Lithium Ion Batteries: A Review of Materials", J. Electrochemical. Sci. Techno. 6(1), 1-6 (2015).

Li, Qiuyan, et al., "Failure Analysis and Design Principles of Silicon-Based Lithium-Ion Batteries Using Micron-Sized Porous Silicon/Carbon Composite", SSRN, posted Jun. 30, 2022, https://papers.ssrn.com/sol3/papers.cfm?abstract_id=4150565.

Li, Changling, et al., "Silicon Derived from Glass Bottles as Anode Materials for Lithium Ion Full Cell Batteries", Scientific Reports, 7:917, 11 pages, published Apr. 19, 2017.

(56) References Cited

OTHER PUBLICATIONS

Lu, Yang, et al., "Cold welding of ultra thin gold nanowires", Nature Nanotechnology, vol. 5, Mar. 2010.
Maroni, Fabio, et al., "Near-Zero Volume Expansion Nanoporous Silicon as Anode for Li-ion Batteries", Journal of the Electrochemical Society, 2022 169 080506, published Aug. 8, 2022.
McBrayer, Josefine D., et al., "Calendar aging of silicon-containing batteries", Nature Energy,vol. 6, Sep. 2021, 866-872, www.nature.com/natureenergy.
Nguyen, Van At, et al., "Review-Conducting Polymer-Based Binders for Lithium-Ion Batteries and Beyond", Journal of the Electrochemical Society, 2020 167 065501.
Nzabahimana, Joseph, "Porous carbon-coated ball-milled silicon as high-performance anodes for lithium-ion batteries", J Master Sci (2019) 54: 4798-481; http://doi.org/10.1007/s10853-018-3164-9 p. 4801 para 2, Scheme 1; p. 4802 para 2; Figure 1(d).
Scheffler, Sören, et al., "Calendering of Silicon-Containing Electrodes and Their Influence on the Mechanical and Electrochemical Properties", Batteries 2022, 8, 46. https://doi.org/10.3390/batteries8050046, published May 18, 2022.
Shen, Xiaohui, et al., "Research progress on silicon/carbon composite anode materials for lithium-ion battery", Journal of Energy Chemistry 27 (2018) 1067-1090.
Situmeang, Rudy Tahan Mangapul, "Preparation of Hollow Nanostructures via Various Methods andTheir Applications", From the Edited Volume, Novel Nanomaterials, Edited by Karthikeyan Krishnamoorthy, published: Jan. 4, 2021.
Suthabanditpong, W., et al., "Improved optical properties of silica/UV-cured polymer composite films made of hollow silica nanoparticles with a hierarchical structure for light diffuser film applications", Phys. Chem. Chem. Phhys., 2016, 18, 16293.
Tan, Darren H.S., et al., "Carbon-free high-loading silicon anodes enabled by sulfide solid electrolytes", Science 373, 1494-1499 (2021) Sep. 24, 2021.
Tong, Ling, et al., "Interface Engineering of Silicon/Carbon Thin-Film Anodes for High-Rate Lithium-Ion Batteries", ACS Apps. Mater. Interfaces 2020, 12, 29242-29252.
Tseng, Yu-Hsien, et al., "On-site coagulation gel polymer electrolytes with a high dielectric constant for lithium-ion batteries", Journal of Power Sources 480 (2020) 228802.
Wang, Dingsheng, et al., "High performance amorphous-Si@SiOx/C composite anode materials for Li-ion batteries derived from ball-milling and in situ carbonization", Journal of Power Sources 256 (2014) 190-199.
Wang, Wei, et al., "Monodisperse Porou Silicon Spheres as Anode Materials for Lithium Ion Batteries", Scientific Reports, 5: 8781 6 pages, published Mar. 5, 2015.
Wang, Fei, et al., "One-pot solution synthesis of carbon-coated silicon nanoparticles as an anode material for lithium-ion batteries", Chem. Commun., 2020, 56, 1109-1112.
Yan, Zheng, "Silicon Li-ion Anode Materials via Spray Drying and Magnesiothermic Reduction", published on Jun. 2019, Chemical and Environmental Engineering, pp. 1-106).
Yazdi, Sadegh, et al., "Tuning the Resonance Frequency of Surface Plasmons Localized in Au—Ag Bimetallic Hollow Nanorods In-situ in a Transmission Electron Microscope", Technical Report, Microscopy and Microanalysis, Jul. 2016.
Zhang, Tianwen, "Porous silicon nano-aggregate from silica fume as an anode for high energy lithium-ion batteries", RSC Adv. 2016, 6, 30577-30581.
Wikipedia definition for Porous Silicon, 8 pages, first downloaded Oct. 6, 2020.

\* cited by examiner

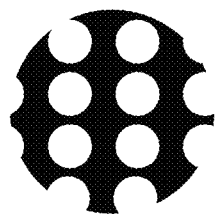 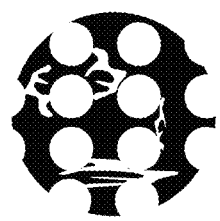 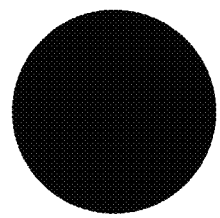
Figure 9A
Figure 9B
Figure 9C
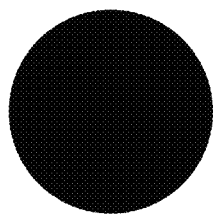 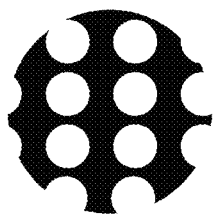 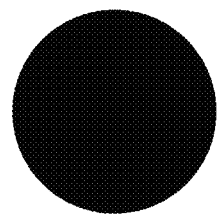
Figure 10A
Figure 10B
Figure 10C
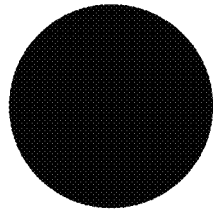  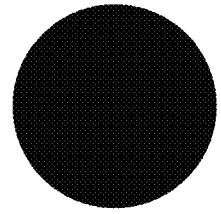
Figure 11A
Figure 11B
Figure 11C
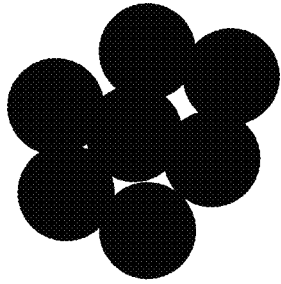 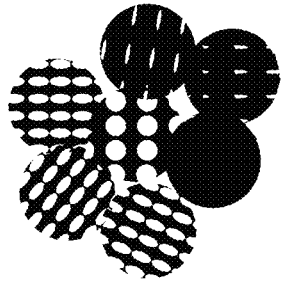 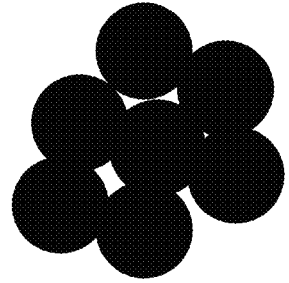
Figure 12A
Figure 12B
FIGURE 12C

POROUS SILICON MATERIAL AND METHOD OF MANUFACTURE

CROSS-REFERENCE TO RELATED APPLICATIONS

This application claims the benefit of U.S. Provisional Application No. 63/288,831, filed 13 Dec. 2021, which is incorporated in its entirety by this reference.

TECHNICAL FIELD

This invention relates generally to the silicon material field, and more specifically to a new and useful system and method in the silicon material field.

BRIEF DESCRIPTION OF THE FIGURES

FIGS. 9A, 9B, and 9C are views along a pore axis, in a cross-sectional plane perpendicular to the pore axis, and along an axis perpendicular to the pore axis for an exemplary silicon particle.

FIGS. 10A, 10B, and 10C are views along a pore axis, in a cross-sectional plane perpendicular to the pore axis, and along an axis perpendicular to the pore axis for an exemplary silicon particle.

FIGS. 11A, 11B, and 11C are views along a first axis, in a cross-sectional plane, and along a second axis perpendicular to the first axis for an exemplary silicon particle.

FIGS. 12A, 12B, and 12C are views along a first axis, in a cross-sectional plane, and along a second axis perpendicular to the first axis for an exemplary silicon particle.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
FIG. 1 is a cross-sectional representations of an exemplary silicon particle.

The silicon material 10 can include one or more particles, where (as shown for example in FIG. 1) each particle can include elemental silicon, dopants (e.g., elemental dopants), stabilizing agents (e.g., elemental stabilizing agents such as oxygen or other chalcogens), a coating, and/or any suitable elements or materials.

Figure 2:
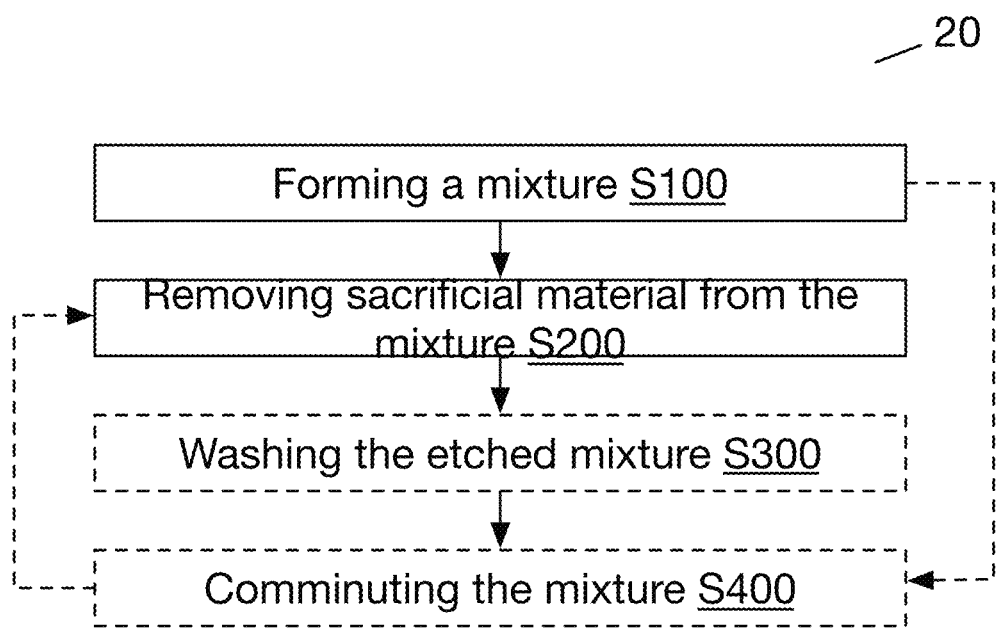
FIG. 2 is a schematic representation of an exemplary method for manufacturing a silicon material.

As shown in FIG. 2, the method 20 can include forming a mixture S100, removing sacrificial material from the mixture S200. The method can optionally include washing the etched mixture S300, comminuting the mixture (e.g., etched mixture, formed mixture, etc.) S400, and/or any suitable steps.

The silicon material is preferably used as (e.g., included in) an anode material (e.g., an anode slurry) in a battery (e.g., a Li-ion battery, in combination with a lithium transition metal cathode, in a battery or as a silicon-containing anode such as disclosed in U.S. patent application Ser. No. 17/672,532 titled 'SILICON ANODE BATTERY' filed 15 Feb. 2022 which is incorporated in its entirety by this reference, etc.). For instance, the silicon material can be used with a lithium transition metal oxide battery (e.g., LMC, LMO, NMC, etc.), a separator, an electrolyte (e.g., $LiPF_6$, $LiBF_4$, $LiClO_4$, etc.; solid based electrolyte such as $Li_2SP_2S_5$, $Li_2SGa_2S_3GeS_2$, $Li_2SSiS_2$, LiSiO, LiGeO, $Li_9SiAlO_8$, etc.; etc.), and a housing. However, the silicon material can additionally or alternatively be used for photovoltaic applications (e.g., as a light absorber, as a charge separator, as a free carrier extractor, etc.), as a thermal insulator (e.g., a thermal insulator that is operable under extreme conditions such as high temperatures, high pressures, ionizing environments, low temperatures, low pressures, etc.), for high sensitivity sensors (e.g., high gain, low noise, etc.), as a radar absorbing material, as insulation (e.g., in buildings, windows, thermal loss and solar systems, etc.), for biomedical applications, for pharmaceutical applications (e.g., drug delivery), as an aerogel or aerogel substitute (e.g., silicon aerogels), and/or for any suitable application. For some of these applications, the silicon material can be oxidized into silica (e.g., $SiO_2$ that retains a morphology substantially identical to that of the silicon material) and/or used as silicon. The silicon can be oxidized, for example, by heating the silicon material (e.g., in an open environment, in an environment with a controlled oxygen content, etc.) to between 200 and 1000° C. for 1-24 hours. However, the silicon could be oxidized using an oxidizing agent and/or otherwise be oxidized.

2. Benefits.

Variations of the technology can confer several benefits and/or advantages.

First, variants of the technology can include dopants (e.g., carbon dopants) which can impact (e.g., increase, decrease) a conductivity (e.g., electron conductivity, ion conductivity, etc.) of the silicon material, improve a homogeneity of a coating (e.g., carbonaceous, carbon-containing, etc. coating) on the silicon particle, and/or can otherwise impact a property of the silicon material (e.g., relative to a pristine silicon material, relative to a silicon material including a native oxide, etc.).

Second, variants of the technology can include dopants (e.g., carbon dopants) that can modify (e.g., inhibit, promote, etc.) the formation of and/or extent of silicon crystallization (e.g., promote the formation of amorphous silicon, promote the formation of crystalline silicon, etc.). For instance, inclusion of about 1-10% carbon (e.g., by mass, by volume, by elemental composition, etc.) can result in a silicon particle that is not fully crystalline (e.g., is at most about 50% crystalline, is at most about 60% crystalline, is at most about 75% crystalline, is at most about 80% crystalline, is at most about 90% crystalline, is at most about 95% crystalline, is at most about 97% crystalline, is at most about 98% crystalline, is at most about 99% crystalline, etc. where the crystallinity can be determined using diffraction measurements such as electron diffraction, neutron diffraction, x-ray diffraction, etc.). Amorphous silicon can be advantageous for accommodating lithium (or other metal) intercalation (e.g., during battery cycling) with less expansion, less stress, less strain, and/or can otherwise be beneficial.

Third, variants of the technology can increase a stability of the silicon material, which can enable the silicon material to be used for cycling a battery a predetermined number of times (e.g., a greater number of times than would be possible without the inclusion of or presence of dopants). For example, the silicon material can achieve a high cyclability (e.g., ability to charge and discharge between two voltages at least 100, 200, 300, 500, 1000, 2000, 5000, 10000, >10000 times; a capacity retention is substantially constant such as greater than about 70% over a predetermined number of cycles; a coulombic efficiency is substantially constant across cycles; lithium insertion into and lithium extracted from the anode during charging and discharging are substantially equal; etc.) when integrated in a battery (e.g., as an anode thereof). However, the silicon material can enable any suitable cyclability.

However, variants of the technology can confer any other suitable benefits and/or advantages.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30%, etc. of a reference), or be otherwise interpreted.

3. Silicon Material.

The silicon material 10 can include one or more particles 100, where each particle can include silicon, dopants 200, stabilizing agents 300, and/or any suitable elements or materials. The silicon material can function as (e.g., be used for) energy storage (e.g., as a material for a battery anode), for photovoltaic applications, as a thermal insulator, for material absorption and/or release, as an aerogel, and/or can otherwise function. The silicon material can include a single particle, a plurality of particles (e.g., a given mass of particles, a given volume of particles, a given number of moles of particles, a given number of particles, etc.), and/or to any suitable particles. The silicon material can be an alloy, a composite, pure (or high purity) silicon, and/or can have any composition.

The silicon material is preferably majority silicon (e.g., at least about 50% Si such as 60%, 65%, 70%, 75%, 80%, 90%, 95%, 97.5%, 99%, 99.9%, 85-93%, 50-95%, 80-95%, values or ranges therebetween, etc.). The silicon concentration (e.g., as a percentage) of the silicon material can refer to a mass percent, purity percent, volume percent, stoichiometric ratio (e.g., stoichiometric percent), and/or any suitable percentage. However, the silicon material can be a plurality silicon (e.g., more silicon than any other constituent but not greater than 50% silicon), and/or have any suitable silicon concentration.

The silicon material preferably includes at most about 45% of dopant (e.g., (e.g., 45%, 40%, 30%, 25%, 20%, 15%, 10%, 5%, 2%, 1%, 0.5%, 0.1%, 2-10%, etc.; where percentage can refer to a mass percent, weight percent, stoichiometric percentage, etc.). However, the silicon material can additionally or alternatively include greater than 45% dopant. The dopant concentration can refer to a total dopant concentration (e.g., for all dopants when more than one dopant is included), a dopant concentration for a particular dopant, and/or any suitable concentration. The dopant concentration can depend on a target conductivity (e.g., a target electrical conductivity, a target ionic conductivity, etc.), a characteristic particle size, a stabilizing agent concentration, a target mechanical property of the silicon material (e.g., a target mechanical compliance, a target resilience to mechanical stress and/or strain during expansion and/or contraction, etc.), a target capacity (which can be estimated by a linear interpolation between the capacity of silicon and the capacity of the dopant), a function of the dopant, and/or any suitable property. The concentration can be a mass concentration, purity, atomic, stoichiometric, volumetric, and/or any suitable concentration.

The dopant(s) 200 can function to modify a crystallinity of, modify (e.g., increase, decrease) a conductivity and/or transport (e.g., thermal, electrical, ionic, atomic, etc. conductivity) of, modify (e.g., increase, decrease) a stability (e.g., thermal stability, mechanical stability, etc.) of the silicon material (e.g., by absorbing stress or strain during expansion and/or contraction of the silicon material, etc.), modify (e.g., increase, decrease, etc.) an ability of the silicon material to form an SEI (solid electrolyte interphase) layer (e.g., before and/or during battery operation), modify a quality (e.g., stability, uniformity, tensile stress accommodation, compressive stress accommodation, etc.) of an SEI layer, modify (e.g., enhance, decrease, homogenize, etc.) coating growth on the silicon material, and/or can otherwise modify a property of the silicon material. For example, a dopant (such as carbon, carbonaceous dopant, etc.) can absorb stress, which can help or enable the silicon material (e.g., particles) to stay more intact, accommodate expansion stress (e.g., without substantially breaking an SEI layer, without substantially degrading the particles, etc.), and/or can otherwise influence the silicon material. In another example, a dopant can improve a conductivity and/or transport (e.g., of an ion, of electricity, etc.) through a silicon material. For instance, the dopant can increase the conductivity and/or transport by less than 0.01%, about 0.01%, about 0.05%, about 0.1%, about 0.5%, about 1%, about 5%, about 10%, about 50%, about 100%, about 500%, values therebetween greater than 500% and/or by any suitable amount relative to undoped silicon material. The amount or extent of impact that the dopants have on properties of the silicon material and/or its applications (e.g., in a battery anode formed from the silicon material) can depend on the dopant distribution, dopant material, dopant concentration, and/or any suitable dopant properties.

The dopant(s) are preferably crystallogens (also referred to as a Group 14 elements, adamantogens, Group IV elements, etc. such as carbon, germanium, tin, lead, etc.). However, the dopant(s) can additionally or alternatively include: chalcogens (e.g., oxygen, sulfur, selenium, tellurium, etc.), pnictogens (e.g., nitrogen, phosphorous, arsenic, antimony, bismuth, etc.), Group 13 elements (also referred to as Group III elements such as boron, aluminium, gallium, indium, thallium, etc.), halogens (e.g., fluorine, chlorine, bromine, iodine, etc.), alkali metals (e.g., lithium, sodium, potassium, rubidium, caesium, etc.), alkaline earth metals, transition metals, lanthanides, actinides, and/or any suitable materials.

The dopants can be interstitial dopants (e.g., occupy interstitial sites), substitutional dopants (e.g., replace an atom within a lattice or other structure), surface dopants (e.g., occupy surface locations), grains, particles (e.g., with a particle size smaller than a particle of the silicon material, fitting within void space between particles, fitting within a pore or other void space of the particle, with a characteristic size between about 1 nm to 1 μm, etc.), and/or any suitable dopants. The dopants can additionally or alternatively form regions (e.g., grains, islands, etc.) with particles where the regions can be phase segregated, can form bonds (e.g., chemical bonds such as to form an alloy) with the silicon material, occupy void space within the particle, and/or can otherwise be present in the silicon material.

The dopants can be homogeneously distributed and/or heterogeneously distributed. Examples of heterogeneous distributions can include: greater dopant concentrations proximal an external surface of the silicon material, great dopant concentrations distal an external surface of the silicon material (e.g., greater concentration within the center or central region of the silicon material), a patterned dopant distribution (e.g., a radial distribution, a an azimuthal distribution, with a distribution that depends on a particle shape and/or a target particle shape, a distribution that depends on an etchant distribution, a distribution that depends on an etching distribution, a distribution that depends on a mixture formation such as in S100, etc.), islands (e.g., regions of dopant and/or high dopant concentration), and/or any suitable inhomogeneous distribution.

The stabilizing agent concentration (e.g., mass concentration, volume concentration, stoichiometric concentration, etc.) in the silicon material is preferably at most 50% (e.g., 0%, 1%, 2%, 5%, 10%, 20%, 25%, 30%, 40%, 50%, values therebetween, etc.), but can be greater than 50%. The stabilizing agent concentration can refer to a total stabilizing agent concentration (e.g., for all stabilizing agents when more than one stabilizing agent is present), a specific stabilizing agent concentration (e.g., for a particular stabilizing agent), and/or any suitable concentration.

The optional stabilizing agent(s) 300 preferably function to increase a stability (e.g., chemical stability to resist chemical wear; mechanical stability to resist mechanical wear; cyclability of the silicon material to expansion/contraction, charging/discharging, and/or other cyclable processes; etc.) of the silicon material. The stabilizing agent(s) can additionally or alternatively modify an electrical (e.g., capacity) or other property of the silicon material, and/or can otherwise function. The stabilizing agent is typically different from the dopant, but can be the same as the dopant.

The stabilizing agent is preferably oxygen (e.g., forming silicon oxides within the silicon material), but can additionally or alternatively include other chalcogens (e.g., sulfur, selenium, tellurium, polonium, etc.), pnictogens (e.g., nitrogen, phosphorous, arsenic, antimony, bismuth, etc.), and/or any suitable elements and/or molecules (e.g., one or more dopants materials). The stabilizing agent can additionally or alternatively include carbon (e.g., as a carbon coating; such as monolayer graphene, multilayer graphene, graphite, carbon black, amorphous carbon, etc.), germanium, tin, lead, and/or other suitable elements, molecules, and/or materials. Carbon used as a stabilizing agent can be pure carbon and/or can form doped or functionalized species. Examples of doped and/or functionalized carbon include: oxides of carbon (e.g., graphene oxide, graphite oxide, etc.), organochalcogens (e.g., organochalcogen materials; carbon materials including sulfur, selenium, polonium, etc.; etc.), organopnictogens (e.g., organopnictogen materials; carbon material including nitrogen, phosphorous, arsenic, antimony, bismuth, etc.), and/or other suitable elements and/or molecules (e.g., one or more dopant materials) to form doped and/or functionalized carbon materials.

The stabilizing agent can be native (e.g., a native oxide that forms on the silicon material when the silicon material is exposed to an environment that includes oxygen), controlled (e.g., introduced in a predetermined amount and/or manner), and/or can otherwise be introduced or present (e.g., present as unreacted silica from the silica precursor, present in the silica precursor, etc.).

The stabilizing agents are typically inhomogeneously distributed within the silicon material, but can be homogeneously distributed and/or distributed in any manner. In an illustrative example, the stabilizing agent can have a greater concentration proximal (e.g., within a threshold distance such as 0.1, 0.5, 1, 2, 5, 10, 20, 50, etc. nanometers of) an exposed (e.g., to an external environment, to an internal void space, etc.) surface of the silicon material than proximal a central region (e.g., a region greater than a threshold distance from the exposed surface) of the silicon material (e.g., the silicon particle can include a silicon oxide surface). In a variation of this illustrative example, a gradient of stabilizing agent can be present, for instance with a decreasing stabilizing agent concentration as the distance from an exposed surface of the silicon material increases.

The silicon material can include a solid-state mixture of, composite of, alloy of, crystalline combinations of, and/or any suitable materials that include silicon, dopants, and/or stabilizing agents. As a first illustrative example, the silicon material can include a silicon-carbon alloy. As a second illustrative example, the silicon material can include silicon grains and carbon grains. As a third illustrative example, the silicon material can include silicon carbide. As a third illustrative example, any or all of the preceding three examples can be combined (e.g., a silicon particle can include silicon grains, carbon grains, silicon-carbon alloys, and/or silicon carbide). However, the silicon material can include any suitable materials.

In a series of illustrative examples, the elemental composition of the silicon material can include SiOC, SiC, $Si_xO_xC$, $Si_xO_xC_x$, $Si_xC_x$, $SiO_x$, $Si_xO_x$, $SiO_2C$, $SiO_2C_x$, $SiOC_y$, $SiC_y$, $Si_xO_xC_y$, $Si_xO_xC_xY_x$, $Si_xC_xY_x$, $SiO_xY_x$, $Si_xO_xY_x$, $SiO_2CY$, $SiO2C_xY_x$, and/or have any suitable composition (e.g., include additional element(s)), where Y can refer to any suitable element of the periodic table (e.g., halogens, chalcogens, pnictogens, group 13 elements, transition metals, alkaline earth metals, alkali metals, etc.) and x is preferably between 0.001 and 1 (but can be less than 0.001 or greater than 1). For instance, the silicon material can include a composition as disclosed in U.S. patent application Ser. No. 17/525,769 titled 'SILICON MATERIAL AND METHOD OF MANUFACTURE' filed 12 Nov. 2021, which is incorporated in its entirety by this reference.

The silicon material can be amorphous, crystalline (e.g., polycrystalline, monocrystalline, pseudocrystalline, etc.), and/or have any suitable structure. In a specific example, the silicon material (or particles thereof) can include amorphous regions and crystalline regions. The amount (e.g., percentage such as by volume) of the silicon material (or particle thereof) that is amorphous can be about 0.1%, 0.5%, 1%, 2%, 5%, 7.5%, 10%, 15%, 20%, 25%, 30%, 33%, 40%, 50%, 60%, 66%, 70%, 75%, 80%, 85%, 90%, 95%, 99%, 99.5%, 99.9%, and/or any suitable value or range therebetween. However, the silicon material can include any suitable amount of amorphous and/or crystalline silicon. In variants of the silicon that include crystallites (e.g., polycrystalline silicon), the crystallites are preferably significantly smaller than the particle size (e.g., crystallite size < about 10% of the particle size, where crystallite size can be any suitable crystallite characteristic size), which can enable a large number of crystallites within a given particle and can mimic amorphous particles (e.g., can accommodate greater stress or strain because of the presence of the grain boundaries between crystallites). However, the crystallite size can be comparable to the particle size (e.g., >10% off the particle size), and/or any suitable size. In related examples, the crystallinity and/or crystallite size can be influenced (e.g., controlled by) the presence (and/or absence) of, the identity of (e.g., type), the concentration of (e.g., local concentration, average concentration, etc.), distribution of, and/or any suitable property of the dopants, stabilizing agents, impurities, and/or other constituents. As an illustrative example, the inclusion of carbonaceous dopants (e.g., elemental carbon) can lead to regions of and/or a greater degree of amorphous silicon.

The silicon material preferably include particles, but can additionally or alternatively include films (e.g., thin films), swarf, sheets, powder, flakes, and/or any suitable structure.

In variants of the silicon that include particles, the particles 100 can be nanoparticles, microparticles, mesoparticles, macroparticles, and/or any suitable particles. The particles can be discrete and/or connected. In variations, the particles can form clusters, aggregates, agglomers, and/or any suitable structures (e.g., higher order structures). A characteristic size of the particles is preferably between about 1 nm to about 50000 nm such as 2 nm, 5 nm, 10 nm, 20 nm, 25 nm, 30 nm, 50 nm, 75 nm, 100 nm, 125 nm, 150 nm, 175 nm, 200 nm, 250 nm, 300 nm, 400 nm, 500 nm, 1000 nm, 1500 nm, 2000 nm, 5000 nm, 7500 nm, 10000 nm, 15000 nm, 20000 nm, 25000 nm, 30000 nm, 40000 nm, 50000 nm, and/or values or ranges therebetween. However, the characteristic size can additionally or alternatively be less than about 1 nm and/or greater than about 50 μm. In specific examples, the characteristic size can include the radius, diameter, circumference, longest dimension, shortest dimension, length, width, height, pore size, a shell thickness, grain size, and/or any size or dimension of the particle. The characteristic size of the particles is preferably distributed on a size distribution. The size distribution can be a substantially uniform distribution (e.g., a box distribution, a mollified uniform distribution, etc. such that the number of particles or the number density of particles with a given characteristic size is approximately constant), a Weibull distribution, a normal distribution, a log-normal distribution, a Lorentzian distribution, a Voigt distribution, a log-hyperbolic distribution, a triangular distribution, a log-Laplace distribution, and/or any suitable distribution.

The particles can be freestanding, clustered, aggregated, agglomerated, interconnected, and/or have any suitable relation or connection(s). For example, the particles (e.g., primary structures) can cooperatively form secondary structures (e.g., clusters) which can cooperatively form tertiary structures (e.g., agglomers). In another example (as shown for instance in FIGS. 12A, 12B, and 12C), the silicon material can include a plurality of silicon particles that are fused together. However, the particles can have any suitable structure.

The particles can be solid, hollow (e.g., include internal pores that are not exposed to an exterior environment, as shown for instance in FIG. 10A, FIG. 10B, and FIG. 10C), porous (as shown for instance in FIGS. 8A-8C, FIGS. 9A-9C, FIGS. 11A-11C, etc.), define a void space, and/or can include any suitable structure. The shape of the particles can be spheroidal (e.g., spherical, ellipsoidal, etc.); rod; platelet; star; pillar; bar; chain; flower; reef; whisker; fiber; box; polyhedral (e.g., cube, rectangular prism, triangular prism, include straight edges, etc.); have a worm-like morphology (e.g., vermiform); have a foam like morphology; have an egg-shell morphology; have a shard-like morphology; have an irregular and/or have any suitable morphology.

The porosity (e.g., void fraction such as the fraction or percentage of the volume that voids occupy within the material) of the silicon material can function to provide space for the silicon to expand within. The porosity of the silicon material is preferably between about 25 and about 99.99%, such as 30%, 35%, 40%, 45%, 50%, 55%, 60%, 65%, 70%, 75%, 80%, 85%, 90%, 95%, 97.5%, 98%, 99%, 99.5%, 99.9%, and/or between a range thereof. However, the porosity can be less than 25% and/or greater than 99.99%. The pore volume of the silicon material is preferably between about 0.01 and 5 cm$^3$ g$^{-1}$ (e.g., 0.02, 0.05, 0.07, 0.1, 0.2, 0.5, 0.7, 1, 2 cm$^3$ g$^{-1}$, etc.), but can be less than 0.01 cm$^3$ g$^{-1}$ or greater than 5 cm$^3$ g$^{-1}$. The density of the silicon material is preferably between about 0.02 g/cm3 and 1.75 g/cm$^3$. However, the silicon material can have a density greater than 1.75 g/cm$^3$ or less than about 0.02 g/cm$^3$.

The pores can be or include nanopores, mesopores, micropores, and/or macropores. The pore size (e.g., pore diameter; pore radius; pore cross-sectional dimension such as length, width, diagonal extent, longest direction, shortest direction, etc.; etc.) of the silicon material is preferably a value and/or range between about 0.1 nm and about 5 μm, such as 0.2 nm, 0.5 nm, 1 nm, 2 nm, 5 nm, 10 nm, 20 nm, 25 nm, 30 nm, 40 nm, 50 nm, 75 nm, 100 nm, 150 nm, 200 nm, 300 nm, 400 nm, 500 nm, 750 nm, 1 μm, 1.5 μm, 2 μm, 3 μm, 4 μm, 5 μm, and/or a range or value therebetween. However, the pore size can be within a range above or below those values, be less than 0.1 nm or greater than 1 μm, and/or otherwise sized. The pore size is preferably distributed on a pore size distribution. However, the pore size can additionally or alternatively vary throughout the sample (e.g., engineered pore size gradient, accidental or unintentional pore size variations, etc.), and/or the silicon material can have any suitable pore size.

Figure 6A:
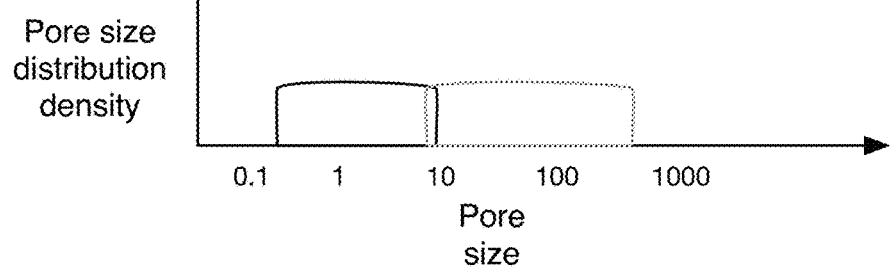
FIGS. 6A, 6B, and 6C are exemplary pore size distributions for variations of silicon particles.
Figure 6B:
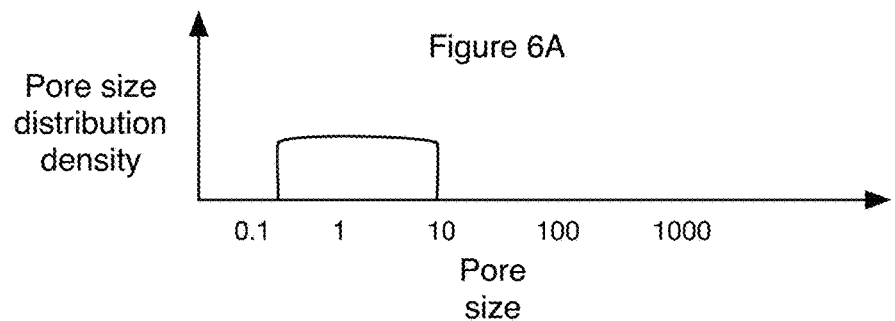
Figure 6C:
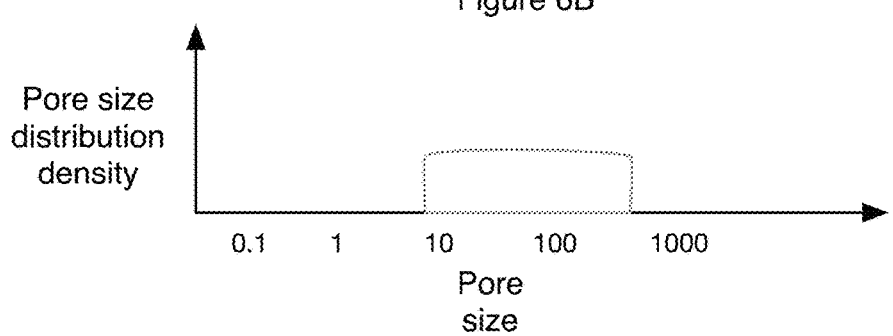
Figure 7:
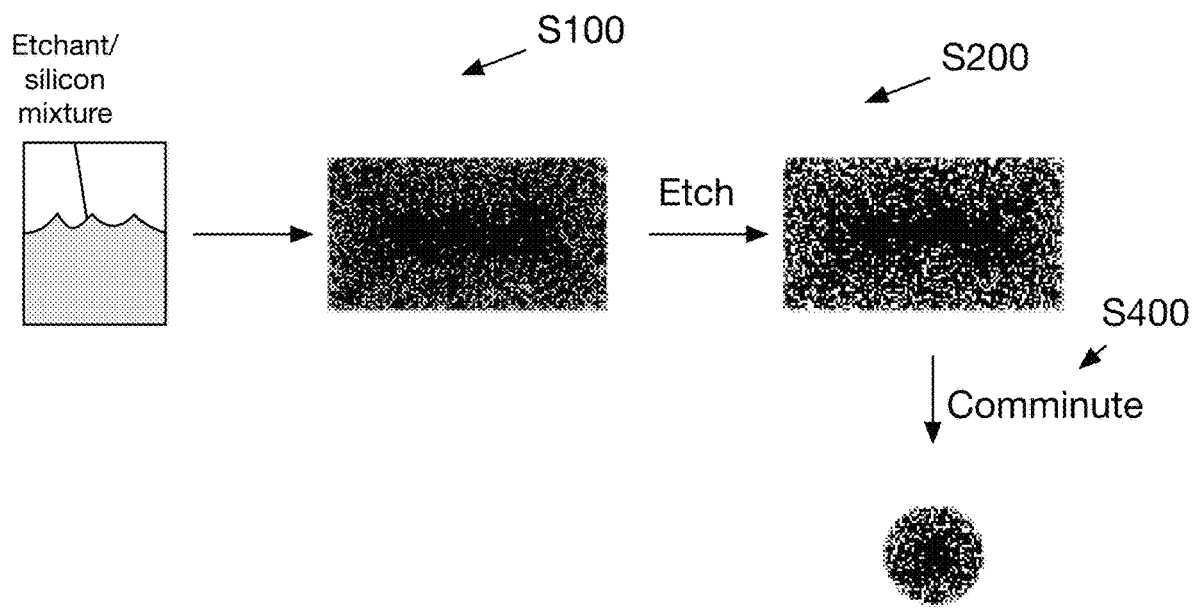
FIG. 7 is a schematic representation of a variation of a method for manufacturing an exemplary silicon material.

The pore size distribution can be monomodal or unimodal, bimodal, polymodal, and/or have any suitable number of modes. In specific examples, the pore size distribution can be represented by (e.g., approximated as) a gaussian distribution, a Lorentzian distribution, a Voigt distribution, a uniform distribution, a mollified uniform distribution (as shown for example in FIG. 6A, FIG. 6B, FIG. 6C, etc.), a triangle distribution, a Weibull distribution, power law distribution, log-normal distribution, log-hyperbolic distribution, skew log-Laplace distribution, asymmetric distribution, skewed distribution, and/or any suitable distribution.

In some variants, the silicon material can have a plurality of pore sizes and/or pore size distributions. In an illustrative example (as shown for instance in FIG. 6A), the silicon material can include a first pore size distribution that can include pores that are approximately 0.2-10 nm (e.g., random pores throughout the silicon material) and a second pore size distribution that can include pores that are approximately 0.01 to 0.5 μm (e.g., corresponding to through pores, an array of pores, etc.). In a variation of this illustrative example, the first pore size distribution can be associated with pores formed by etching away etchants that were intermixed with the silicon and the second pore size distribution can be associated with pores formed by etching away etchants that formed a macrostructure (e.g., lamellar structure, rod-like structure, globular structure, acidular structure, etc.) during cooling of a eutectic solution between the silicon and the etchants. However, the silicon material can have any suitable pores and/or pore distribution.

The pore distribution throughout the silicon material can be: substantially uniform, random, engineered (e.g., form a gradient along one or more axes), or otherwise configured. The distribution of pore sizes throughout the silicon material can be: uniform, random, engineered (e.g., form a gradient along one or more axes), or otherwise configured.

The pore shape (e.g., pore shape cross-section) can be circular, ovular, elliptical, stadium-shaped, polygonal (e.g., square, rectangular, etc.), irregular (as shown for example in FIG. 1 or FIG. 11B), and/or can have any suitable pore shape.

In an illustrative example, the pores can each be associated with (e.g., aligned to) a shared pore axis (as shown for instance in FIG. 8A and FIG. 8B, FIG. 10B, etc.) such as having a cylindrical or prismatic 3D extent through the silicon material. In another illustrative example, the pores can be random (or pseudo-random) such as having no relative alignment throughout the silicon material (as shown for example in FIG. 11B where different slices of the particle would likely have different cross sectional pore geometries). In a third illustrative example, a particle can include aligned pores and random pores (as shown for instance in FIG. 9B, by combining the preceding two examples, etc.). In a fourth illustrative example, when two or more particles are fused together (e.g., in a method as described in U.S. patent application Ser. No. 17/824,640 titled 'SILICON MATERIAL AND METHOD OF MANUFACTURE' filed 25 May 2022, which is incorporated in its entirety by this reference), the different constituent particles typically different pore alignment axes (e.g., as shown for instance in FIG. 12B). However, the constituent particles of the fused particle can have the same pore alignment axis.

Figure 8A:
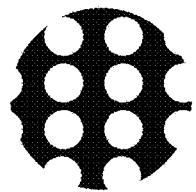
FIGS. 8A, 8B, and 8C are views along a pore axis, in a cross-sectional plane perpendicular to the pore axis, and along an axis perpendicular to the pore axis for an exemplary silicon particle.
Figure 8B:
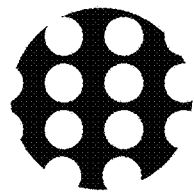
Figure 8C:
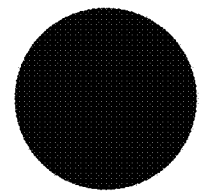

The pores can be exposed to an external environment (e.g., in fluid communication with an environment proximal the particle, as shown for instance in FIG. 8A, FIG. 9A, etc.) and/or can be sealed within the particle (e.g., not in fluid communication with an environment proximal the particle, as shown for instance in FIG. 10A, FIG. 12A, etc.). However, the pores can otherwise be arranged.

The surface area (e.g., BET surface area, specific surface area, etc.) of the silicon material is preferably less than about 10 m$^2$/g (which can be beneficial for improving a first cycle coulombic efficiency as there is less surface area for an SEI layer to form on less Li+ consumed, less area for repeated SEI formation to occur on, etc.). However, the surface area can be greater than about 10 m$^2$/g and/or any suitable value.

Figure 14:
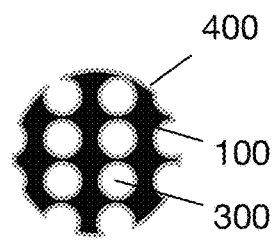
FIG. 14 is a schematic representation of a variation of an exemplary silicon particle that includes a coating.

As shown for example in FIG. 14, the silicon material can optionally include a coating 400, which can function to modify (e.g., tune, improve, change, decrease, etc.) a physical, chemical, electrical, and/or other properties of the silicon material. The coating is preferably disposed on the external surface of the silicon material, but can additionally or alternatively be formed on an internal surface of the silicon material. The coating is preferably homogeneous (e.g., substantially uniform surface coverage; substantially uniform thickness such as varies by at most 1%, 2%, 5%, 10%, 20%, etc. across the silicon material; as shown for example in FIG. 14; etc.), but can be inhomogeneous (e.g., patterned, on a given particle, between particles, on a given cluster, between clusters, on an agglomer, between different agglomers, etc.). The coating can penetrate the pores, not penetrate the pores (e.g., coat a bounding surface of the particle(s) that the particles form an internal void space that is substantially devoid of coating material and is defined by the coating material surrounding the particle), partially penetrate the pores (e.g., penetrate pores with greater than a threshold size such as 10 nm pores, 20 nm pores, 50 nm pores, 100 nm pores, 500 nm pores, etc.; penetrate pores that are random or pseudorandom; penetrate pores that are aligned to a shared pore axis; penetrate pores with a given geometry; etc.), and/or can coat the silicon material in any manner.

In some variations, dopants of the silicon material can lead to (e.g., promote) a more homogeneous coating. In an illustrative example, carbon dopants (particularly dopants near the particle surface) can act as coating growth sites (where the coating growth can then propagate from the growth sites).

The coating thickness is preferably a value or range thereof preferably between about 0.3-10 nm such as 0.3 nm, 0.345 nm, 0.7 nm, 1 nm, 2 nm, 2.5 nm, 3 nm, 4 nm, 5 nm, 6 nm, 7 nm, 8 nm, 9 nm, 10 nm, and/or values therebetween. However, the coating thickness can be less than 0.3 nm or greater than 10 nm.

The coating material is preferably carbonaceous (e.g., contains the element carbon), but can additionally or alternatively include metals (e.g., lithium, sodium, magnesium, etc.), oxides (e.g., $SiO_x$), inorganic polymers (e.g., polysiloxane), metallopolymers, and/or any suitable materials. Examples of carbonaceous materials include: organic molecules, polymers (e.g., polyethylene (PE), polypropylene (PP), polyvinyl chloride (PVC), polystyrene (PS), polyurethane (PU), polyamide, polyacrylonitrile (PAN), polyacrylamide, polylactic acid, polyethylene terephthalate (PET), phenolic resin, polypyrrole, polyphenylene vinylene, polyacetylenes, polyfluorene, polyphenylene, polypyrene, polyazulene, polynapthalene, polycarbazole, polyindole, polyazepine, polyaniline, polythiophene, polyphenylene sulphide, poly(3,4-ethylenedioxythiophene), recycled polymers, etc.); inorganic carbon (e.g., amorphous carbon, charcoal, diamond, graphite, graphene, nanorods, etc.), and/or any suitable carbonaceous materials.

In some variants, the silicon material can include a coating (and/or can be coated) as disclosed in U.S. patent application Ser. No. 17/890,863 titled 'SILICON MATERIAL AND METHOD OF MANUFACTURE' filed 18 Aug. 2022, which is incorporated in its entirety by this reference.

4. Method.

As shown in FIG. 2, the method can include forming a mixture S100, removing sacrificial material from the mixture S200. The method can optionally include washing the etched mixture S300, comminuting the mixture (e.g., etched mixture, formed mixture, etc.) S400, and/or any suitable steps.

The method and/or steps thereof can be performed in a single chamber (e.g., a furnace, an oven, etc.) and/or in a plurality of chambers (e.g., a different chamber for each step or substep, a heating chamber, a coating chamber, a milling chamber, a comminution chamber, a fusion chamber, a washing chamber, etc.). The method can be performed on a laboratory scale (e.g., microgram, milligram, gram scale such as between about 1 μg and 999 g), manufacturing scale (e.g., kilogram, megagram, etc. such as between about 1 kg and 999 Mg), and/or any suitable scale.

Figure 3:
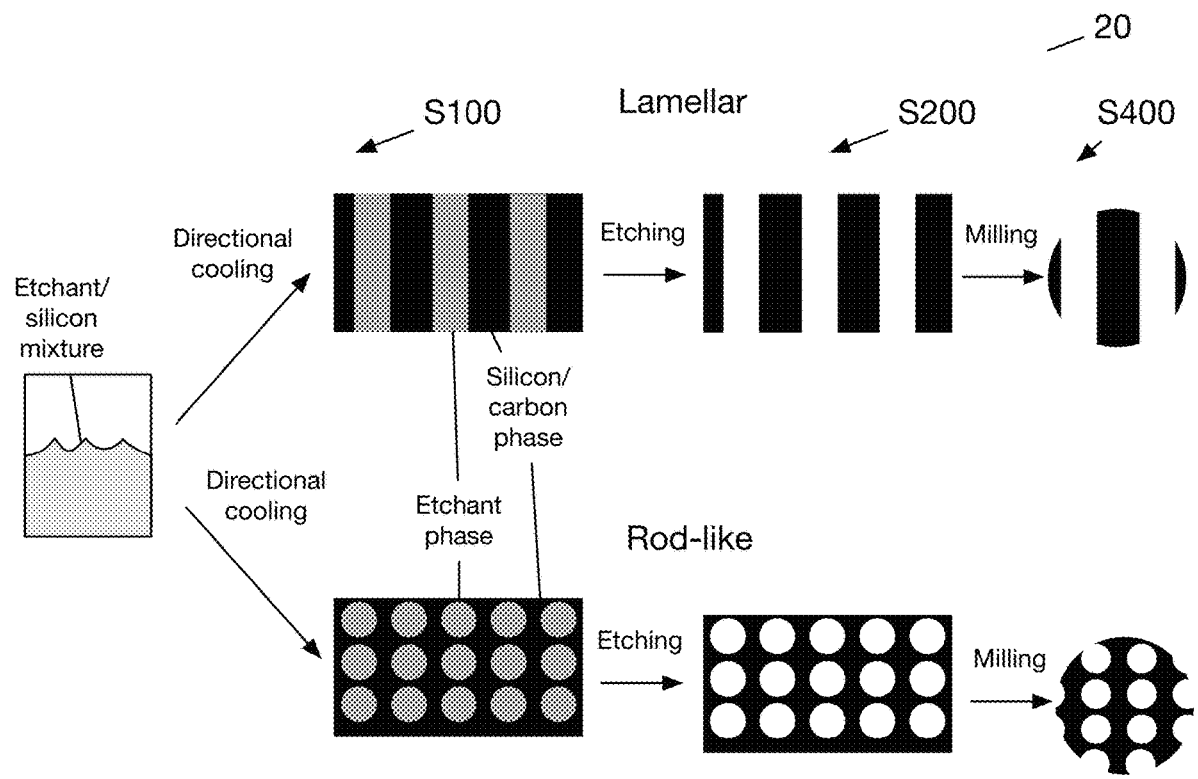
FIG. 3 is a schematic representation of a variation of a method for manufacturing an exemplary silicon material.
Figure 13:
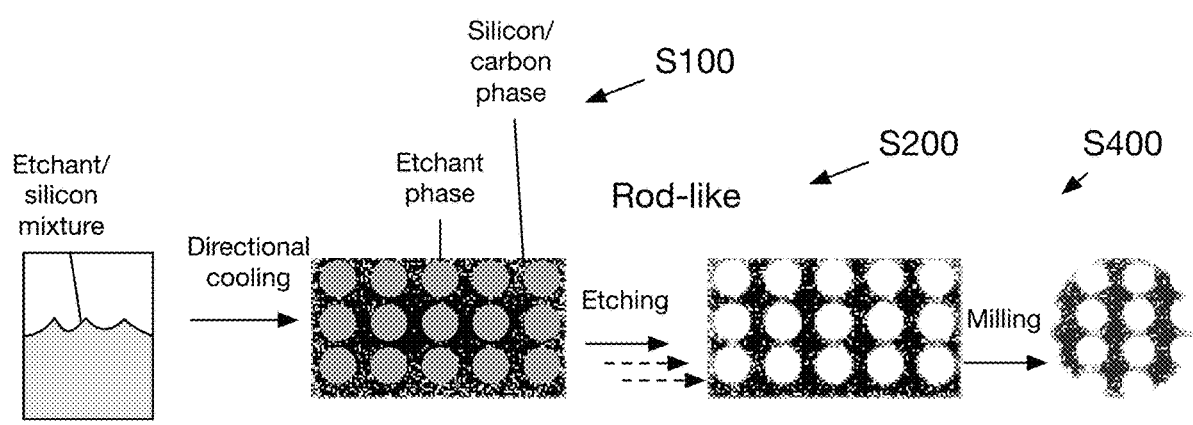
FIG. 13 is a schematic representation of a variation of a method for manufacturing an exemplary silicon material.

Forming a mixture S100 functions to prepare (e.g., make, form, produce, etc.) a mixture of silicon and one or more other elements where the mixture can be used to generate a porous silicon material (e.g., a material as described above). The mixture can be a composite (e.g., include a plurality of grains, particles, etc. consisting essentially of distinct materials), alloy, chemical structure (e.g., molecular solid), and/or can have any suitable composition. In some variants (as shown for example in FIG. 3 and/or FIG. 13), the mixture can be a eutectic mixture (e.g., a mixture of the components can be at a eutectic point, a subset of components can be at a eutectic point, etc.). In these variants, the mixture can phase segregate (e.g., during cooling, after a pressure change, with a change in environment, etc.) which can lead to a two (or more) phase mixture (e.g., two solid phases with different compositions) being formed.

The elemental composition of the mixture can include: silicon, a dopant (e.g., carbon), stabilizing elements (e.g., chalcogens such as oxygen, pnictogens such as nitrogen, etc. also sometimes referred to as stabilizing agent), sacrificial elements (e.g., agents to be etched such as alkali metals such as lithium, sodium, potassium, rubidium, caesium, etc.; alkaline earth metals such as magnesium, calcium, beryllium, strontium, barium, etc.; transition metals such as chromium, gold, titanium, vanadium, nickel, platinum, tungsten, molybdenum, cobalt, copper, iron, manganese, zirconium, rhodium, iridium, etc.; rare earth metals; metalloids; semi-metals; post-transition metals such as aluminium, gallium, etc.; etc.), reducing agents (e.g., alkaline earth metals such as magnesium, aluminium, etc.), and/or any suitable elemental and/or chemical species.

The elemental composition of each constituent of the mixture can depend on the target porosity, the target dopant concentration, the eutectic material system (e.g., the ratio of silicon to sacrificial element that forms a eutectic phase with a high-purity silicon phase), a target particle size, a target stabilizing element composition, an operation temperature, a mixture formation mechanism, and/or depend on any suitable information. For example, a sacrificial element composition can be between about 70-99% by volume which result (e.g., after etching, after washing, etc.) in a silicon particle with a porosity that is between about 70-99% by volume (and/or other suitable similar values can result such as 30% sacrificial element by volume would lead to approximately 30% such as 28%-35% porosity, etc.). In a related example, the ratio of carbon to silicon in the mixture is generally unchanged by etching and therefore the mass ratio of these elements is generally set by the mixture. However, in some variations, the carbon and silicon can phase segregate (e.g., more carbon remaining in a silicon phase than a metal-silicide phase, more carbon in a metal-silicide phase than in a silicon phase, etc.) where the ratios (e.g., mass ratios) of the carbon to silicon can be adjusted to account for the differing ratios. As an illustrative example of a mixture composition, to achieve a silicon material with approximately 90% porosity, the mixture can include approximately 90% (e.g., 80-95%) sacrificial material (e.g., by volume). The remaining approximately 10% material can include approximately 90% silicon (e.g., by mass) and approximately 10% carbon (e.g., by mass), which can target a silicon material with a final elemental composition that is at most 10% carbon by mass. Similar analysis can be applied to achieve any target porosity and/or final silicon material elemental composition.

Figure 4:
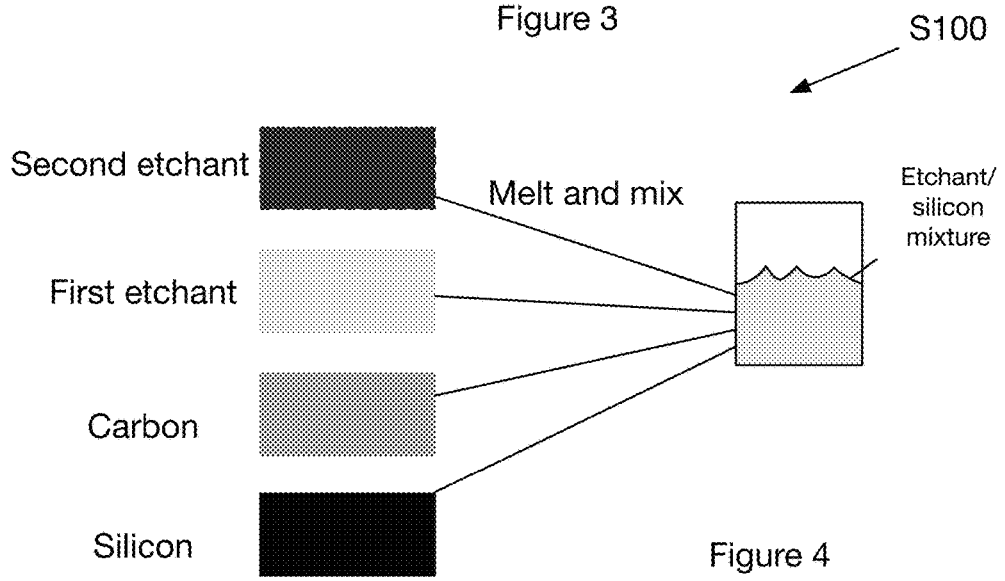
FIG. 4 is a schematic representation of an example of forming a mixture.

The mixture can be formed in liquid phase, gas phase, solid phase, and/or in any suitable phase. For example (as shown for instance in FIG. 4), one or more components of the mixture can be melted and one or more additional components can be dissolved in the melted components. In a variation of this example, all of the components can form a fluid phase (e.g., be melted, be sublimed, be evaporated, etc.) and the fluids mixed together. In a second example, the components of the mixture can be combined in the solid phase (e.g., using milling, grinding, mortar and pestle, etc. such as using techniques for solid state reactions). Variations of the second specific example can benefit from (e.g., undergo enhanced homogeneity, require less time, etc.) being performed at higher temperature (e.g., higher than room temperature such as 100° C., 200° C., 300° C., 500°, 700° C., 800° C., 900° C., 1000° C., 1100° C., 1500° C., values or ranges therebetween, etc.). Some variations of the second example can use one or more solvent (e.g., volatile solvent such as acetates, alcohols, chloroform, dichloromethane, monochloromethane, ethers, aliphatic hydrocarbons, aromatic hydrocarbons, chlorinated hydrocarbons, ketones, etc.) can facilitate enhanced mixing (and typically evaporate off within the time scale that the mixing occurs on thereby leaving little or no residue). In a third example, silicon can be deposited (e.g., by vapor-phase chemical vapor deposition) during alloying of the materials, which can result in silicon being deposited as the carbon and/or sacrifial materials (e.g., metals) melt. In a fourth specific example, two or more of the preceding three examples can be combined.

The components can be mixed for a predetermined amount of time (e.g., 1 min, 2 min, 5 min, 10 min, 20 min, 30 min, 60 min, 2 hr, 4 hr, 6 hr, 8 hr, 12 hr, 18 hr, 24 hr, 30 hr, 36 hr, 48 hr, 72 h, etc.), until a target homogeneity has been achieved, until a target component concentration has been achieved, and/or for any amount of time.

After mixing, the mixture is preferably solidified (e.g., frozen). However the mixture can remain in a fluid state (e.g., where during etching the mixture or remaining components can solidify) and/or any suitable state.

In a first variation of solidifying the mixture, one or more components of the mixture can be deposited on (e.g., grown on) a template. The template can be made of sacrificial material (e.g., to be removed after the silicon, dopants, stabilizing elements, etc. have been grown on the sacrificial material), dopants (e.g., where the dopants can diffuse, intercalate, etc. into the silicon and/or other materials grown thereon), stabilizing elements (e.g., where the stabilizing elements can diffuse, intercalate, etc. into the silicon and/or other materials grown thereon), and/or can be made of any suitable materials (e.g., where the template can be physically, chemically, etc. removed from the silicon material and/or mixture). As an illustrative example, a porous substrate (e.g., porous carbon, carbon fiber, sponge-like carbon, foam, aerogel, metal foam, aluminium sponge, magnesium sponge, etc.) can be used for the templated growth of silicon and carbon. However, any suitable substrate can be used.

As an example of a template, the mixture can be deposited on, grown on, disposed on, etc. a mold (e.g., a pilar structure to form cylindrical pores; a fibrous mold to create random, through-pores; nanomold; etc.), where the mold forms the negative spaces to be made in the silicon material (e.g., forms structured pores in the silicon material where removed). The mixture (e.g., silicon material) can be removed from the mold physically (e.g., where the mold can include a non-stick or low stick surface such that silicon and/or the mixture is readily removed from the mold using mechanical force), chemically (e.g., etching, washing, etc. the mold to leave the mixture), and/or using any suitable removal mechanism. The mold can be formed, for instance, using fabrication techniques such as lithography (e.g., electron beam lithography, photolithography, soft lithography, x-ray lithography, colloidal monolayer lithography, focused ion beam lithography, etc.), film deposition, bonding, molecular self-assembly, electrically induced nanopatterning, rapid prototyping, and/or any suitable fabrication method(s) (e.g., nanofabrication methods). In some variants, features of the mold can be smaller than, the same size as, and/or larger than target features (e.g., pores) of the silicon (e.g., to accommodate expansion or contraction of the mixture or silicon upon removal from the mold). The mold can be made, in some variants, from a dopant material where material from the mold can diffuse into the silicon and/or mixture to dope (or further dope) the silicon (e.g., to achieve a target dopant level, to achieve a target dopant gradient as diffusion will likely lead to a greater dopant concentration near a surface, etc.). However, the mold can additionally or alternatively be made from polymer (e.g., plastic), an inert material (e.g., that does not react with, diffuse into, etc. silicon or other materials of the mixture such as thallium, lead, bismuth, etc.), a metal (e.g., stainless steel), and/or using any suitable material(s).

In a second variation of solidifying the mixture (which can be particularly but not solely beneficial when the mixture or a plurality of components thereof form a eutectic mixture), the mixture can be solidified using a directional solidification process. In the second variation, the mixture can be solidified on a substrate (e.g., a cooled substrate such as cooled to maintain a temperature below a melting temperature of the eutectic mixture, of silicon, of carbon, of the sacrificial material, etc.; approximately room temperature; to a temperature between about 0-700° C.; etc.) that is transported within a casting frame. The rate of transport can, for instance, be between about 1 mm/s and 1 m/s. However, the rate of transport can be less than 1 mm/s or greater than 1 m/s. The temperature of the substrate, the rate of substrate transport, the direction of substrate transport, the thermal contact between the mixture and the substrate (e.g., depending on a substrate material, depending on a distance between the substrate and the melt, depending on a temperature difference between the substrate and the melt, etc.), the mixture temperature, the mixture composition (e.g., amount of dopant, amount of sacrificial material, identity of sacrificial material, etc.), and/or other suitable characteristics can influence the resulting solidified mixture (e.g., macrostructure such as lamella, rodlike, globular, acicular, etc.; macrostructure alignment such as parallel to the direction of transport, perpendicular to the direction of transport, at an angle relative to the direction of transport, random relative to the direction of transport, etc.; size of macrostructural components; separation between macrostructural components; etc.).

Figure 5:
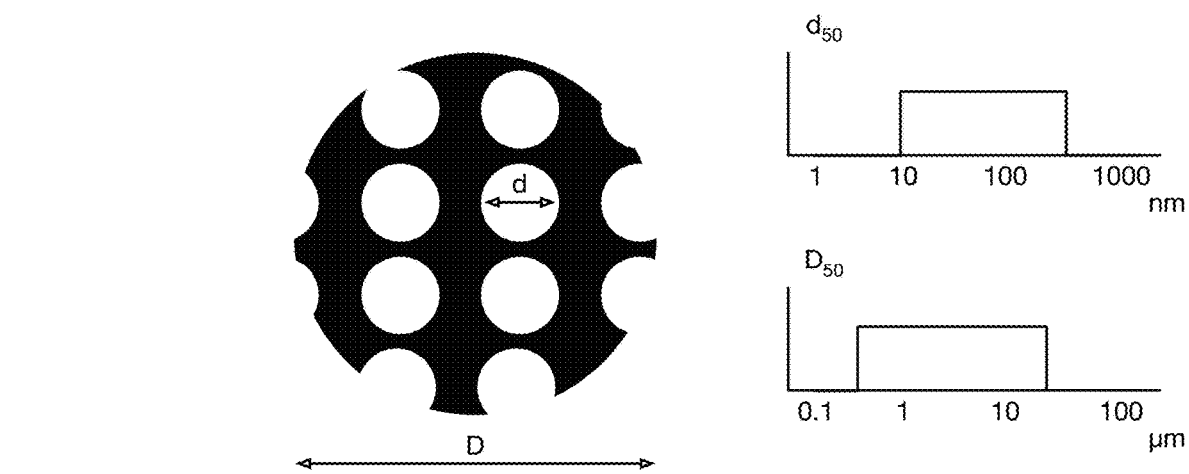
FIG. 5 is a schematic representation of an exemplary silicon particle and exemplary particle size and pore size distributions.

As an illustrative example of the second variation, a mixture of silicon, carbon, and a sacrificial metal (e.g., magnesium, aluminium, chromium, gold, titanium, vanadium, nickel, platinum, tungsten, molybdenum, cobalt, copper, iron, manganese, zirconium, rhodium, iridium, etc.) can be rapidly directionally solidified to for a lamellar and/or rodlike solid with a silicon (and carbon) phase and a metal-silicide phase (which preferably form the rod structures). In variations of this specific example, the solidified mixture can include a silicon phase and a metal phase. However, any suitable phases can be formed. In this example, the lamellae size (e.g., width, spacing, etc.) and/or rod size (e.g., diameter, separation distance between adjacent rods, etc.) can be controlled between about 10-2000 nm (e.g., 100-1000 nm, as shown for instance in FIG. 5, etc.).

In a third variation of solidifying the mixture, the mixture can be solidified by cooling of the mixture. During cooling, the mixture is preferably continuously agitated (e.g., to retain a homogeneity of the mixture components). However, the mixture can be cooled with intermittent agitation and/or without agitation. The mixture can be cooled, for instance, at a rate between about 0.1° C./min and 10° C./min. However, the mixture can be cooled at a rate less than 0.1° C./min or greater than 10° C./min.

In a fourth variation, two or more of the preceding variations can be combined (e.g., a templated substrate can be used in combination with directional cooling).

In some variants (as shown for example in FIG. 13), the mixture can include a plurality of sacrificial elements. For instance, a first sacrificial element can form a eutectic with the silicon and a second sacrificial element can form a random mixture with the silicon. After solidification, the first sacrificial element and silicon can be segregated into different phases, where the second sacrificial element can be randomly distributed throughout the phases.

In variants of S100, silica (e.g., $SiO_2$, $SiO_x$) can be mixed with sacrificial material (e.g., reducing agent such as aluminium, magnesium, etc.) and carbon. Silica (and/or silicon) can include impurities such as iron, copper, nickel, carbon, niobium, and/or other suitable impurity elements. These impurities can function as dopants, sacrificial materials, and/or can otherwise function. However, these impurities can be removed from the silica prior to formation of the mixture.

In some variations of S100, a silicon alloy (e.g., Si—Al—Mg—C alloy, Si—Al—C alloy, Si—Mg—C alloy, etc.) can be oxidized (e.g., by exposing the silicon material or mixture to oxygen, by heating the silicon mixture in an oxidizing environment, by immersing the silicon mixture in aqueous solution, etc.), where the extent of oxidation can be controlled to achieve a target stabilizing agent (e.g., oxygen) concentration. However, oxidation can additionally or alternatively be performed before, during, or after S200, S300, S400, and/or S500.

Removing sacrificial material from the mixture S200 preferably functions to form or introduce pores within the mixture. S200 preferably removes sacrificial material without substantially removing (e.g., removing less than about 1%, 5%, 10%, 20% by mass) silicon, dopants, stabilizing agents, and/or other materials to be present in the silicon material. Relatedly, silicides and/or elements present within silicide or metal phases can be removed.

Sacrificial material can be removed physically (e.g., thermally, mechanically, etc.), chemically (e.g., using an etching agent), electrically, and/or using any suitable removal mechanism.

In variants of S200 that use an etching agent to remove the sacrificial material, the etching agent can be provided in a gas phase, liquid phase, plasma phase, solution phase, and/or in any suitable phase.

The etching agent can depend on the sacrificial material (e.g., composition within the mixture, identity, etc.), etching temperature, pore size, pore distribution, silicide phase composition, and/or other suitable properties. Examples of etching agents include: water (e.g., for alkali metal silicides, alkaline earth metal silicides, etc.), hydrochloric acid, sulfuric acid, nitric acid, hydrofluoric acid (e.g., for transition metals, transition metal silicides, etc. as silicon is substantially inert to hydrofluoric acid), melted hydroxides (e.g., melted potassium hydroxide), halogens (e.g., fluorine, chlorine, bromine, iodine, etc.), and/or any suitable etching agents can be used.

During S200, a temperature of the mixture is preferably kept cold (e.g., at or below about 900° C.) which can be beneficial for minimizing a local heating effect (e.g., prevent, hinder, minimize, etc. local hot spots with a temperature greater than about 1050-1100° C. from forming). However, the temperature of the mixture can be any suitable temperature during S200 (e.g., when the sacrificial materials are removed in an inert atmosphere, cooling may not be required as oxidation is less likely to occur).

In some variants, the sacrificial element removal can be controlled (e.g., temperature, time, reaction conditions, etching agents, etc.) such that sacrificial elements can remain within the silicon material (e.g., thereby acting as a dopant which can enhance electrochemical stability, ionic or electronic conductivity, electrical resistance, structural integrity, etc. of the silicon material) such as to achieve a target dopant concentration, profile, composition, etc. in the silicon material. However, substantially all sacrificial elements (e.g., <1 ppm, <10 ppm, <100 ppm, etc. can remain) can be removed and/or any suitable amount of sacrificial elements can be removed and/or remain.

In some variants (particularly when the mixture includes silicon oxides), removing sacrificial material can include reducing the silicon oxide (e.g., where the sacrificial materials can be converted to oxides which can be washed away). The silicon oxide can be reduced as disclosed in U.S. patent application Ser. No. 17/841,435 titled 'Silicon Material and Method of Manufacture' filed 15 Jun. 2022 which is incorporated in its entirety by this reference, and/or in any suitable manner. For example, the $SiO_x$ in an $SiO_x$—C—Mg, $SiO_x$—C—Al, and/or $SiO_x$—C—Al—Mg mixture can be reduced by heating the mixture to a temperature between about 300° C.-1000° C. for between 1-24 hours. In a variation of this specific example, the mixture can be heated to a first temperature between about 300-500° C. for 1-12 hours and then heated to a second temperature between 700-1000° C. for 1-12 hours. However, the SiOx can be reduced in any manner.

Washing the mixture S300 functions to remove one or more byproducts (e.g., from washing steps, from sacrificial material removal, etc. such as silicides, salts, chlorides, fluorides, bromides, nitrates, sulfates, etc.) and/or residual materials from the silicon material (e.g., the mixture from S100, the mixture with sacrificial material removed from S200, the comminuted mixture from S400, etc.). S300 can be performed before, during, and/or after S100, S200, or S400.

The mixture can be washed with solvent, acid, base, and/or any suitable material(s). Examples of solvents that can be used include: water, alcohols (e.g., methanol, ethanol, 1-propanol, 2-propanol, 1-butanol, 2-butanol, isobutanol, t-butanol, diols, triols, sugar alcohols, etc.), ethers (e.g., dimethyl ether, diethyl ether, methylethyl ether, etc.), esters, aldehydes, ketones (e.g., acetone), halogenated solvents (e.g., chloromethane, dichloromethane, chloroform, carbon tetrachloride, bromomethane, dibromomethane, bromoform, carbon tetrabromide, iodomethane, diiodomethane, iodoform, carbon tetra iodide, dichloroethane, dibromoethane, etc.), and/or any suitable solvents. Examples of acids that can be used include: hydrofluoric acid, hydrochloric acid, hydrobromic acid, hydroiodic acid, sulphuric acid, nitric acid, nitrous acid, acetic acid, carbonic acid, oxalic acid, phosphoric acid, citric acid, trifluoracetic acid, perchloric acid, perbromic acid, periodic acid, acid piranha (e.g., a mixture of sulphuric acid and hydrogen peroxide), and/or any suitable acids. Examples of basic solutions can include: lithium hydroxide, sodium hydroxide, potassium hydroxide, rubidium hydroxide, cesium hydroxide, beryllium hydroxide, magnesium hydroxide, calcium hydroxide, strontium hydroxide, barium hydroxide, ammonium hydroxide, basic piranha (e.g., a mixture of metal hydroxide and hydrogen peroxide), and/or any suitable bases. However, the mixture can be washed using any suitable material(s).

The mixture can be washed a plurality of times. Each wash can use the same or different washing agents. For instance, the mixture can be triple washed with alcohols. In another example, the mixture can be washed using successive solvents such as in order of increasing polarity (e.g., hydrocarbon to ketone to alcohol to water) or in order of decreasing polarity (e.g., water to alcohol to ketone to hydrocarbon). In some variants, the final washing agent can be an alcohol (e.g., methanol, ethanol, isopropyl alcohol, etc.) which can be beneficial as alcohols can be removed by air drying (e.g., blowing air over the surface), using a vacuum, under an inert atmosphere (e.g., dry atmosphere, nitrogen, helium, neon, argon, krypton, xenon, etc.), with gentle heating (e.g., to a temperature between about 50-100° C.), and/or can otherwise be readily removed with gentle conditions. However, any suitable washing agent can be used in any suitable order.

During S300, a temperature of the mixture is preferably kept cold (e.g., using ice, cryogenics, etc.) which can be beneficial for minimizing a local heating effect (e.g., prevent, hinder, minimize, etc. local hot spots with a temperature greater than about 1050-1100° C. from forming) and/or hindering oxidation of the silicon. However, the temperature of the mixture can be any suitable temperature during S300 (e.g., when the mixture is washed in an inert atmosphere, cooling may not be required as oxidation is less likely to occur).

In some variants, S300 can include heating the silicon material. By heating the material, volatile byproducts or constituents (e.g., low vapor pressure materials) can be removed from the mixture. For instance, the mixture can be heated to a temperature between 500° C. and 900° C. (e.g., 700° C., 750° C., 800° C., etc.) which can evaporate or vaporize components such as hydrochloric acid, magnesium salts (such as $MgCl_2$), and/or aluminium salt (such as $AlCl_3$). However, any suitable components can be removed by heating. In some variations, the vaporized agents can be captured (e.g., using a cold trap) where the captured agents can be recycled and/or reused in subsequent iterations of the method.

Comminuting the mixture S400 can function to break the silicon material and/or mixture into particles and/or pulverize the particles (e.g., to decrease a size of the particles). Comminuting the mixture can include pulverizing the silicon material and/or mixture, crushing the silicon material and/or mixture, grinding the silicon material and/or mixture, milling (e.g., ball milling, jet milling, etc.) the silicon material and/or mixture, cutting the silicon material and/or mixture (e.g., nanocutting), vibrating the silicon material and/or mixture (e.g., using a vibrator, vibration grinder, etc.), and/or any suitable comminution process can be used. In a specific example, the silicon material and/or mixture can be comminuted in a manner similar to that disclosed in U.S. patent application Ser. No. 17/841,435 titled 'SILICON MATERIAL AND METHOD OF MANUFACTURE' filed 15 Jun. 2022 which is incorporated in its entirety by this reference. However, the silicon material and/or mixture can be comminuted in any manner.

In some variations, S400 can additionally or alternatively function to seal a surface of the silicon material (e.g., to create a material that includes internal pores that are shielded from the external environment by a sealed surface of the silicon particles or material, to form hollow silicon material, form a material with a larger internal surface area than external surface area, etc.). For instance, the mixture (e.g., silicon material) can be milled (e.g., ball milled, cryo-milled, etc.) continuously at a high rate (e.g., greater than about 500 rpm, greater than about 700 rpm, greater than about 900 rpm, etc.). In one illustrative example, the silicon material and/or mixture can be cold-welded and/or fused in a manner as disclosed in U.S. patent application Ser. No. 17/824,627 titled "SILICON MATERIAL AND METHOD OF MANUFACTURE' filed 25 May 2022 which is incorporated in its entirety by this reference. However, the silicon material and/or mixture can be cold-welded and/or fused in any manner.

In some variants, S400 can additionally or alternatively reduce a silica mixture (e.g., $SiO_x$—C—Mg, $SiO_x$—C—Al, $SiO_x$—C—Mg—Al to Si—C—Mg, Si—C—Al, Si—C—Mg—Al, etc.), where the comminution can heat the silica mixture, provide mechanical energy to induce reduction, and/or can otherwise reduce the silica material.

S400 is often performed after S200. However, S400 can be performed before S200 (e.g., to form particles where sacrificial material is removed from the particles in a manner such as that described in S200), concurrently with S200 (e.g., the mixture can be milled with an etching agent thereby milling and etching the silicon material simultaneously or contemporaneously), before S300, during S300, after S300, and/or with any suitable timing.

In some variations, S400 can be performed a plurality of times. For example, S400 can be performed a first time to pulverize a silicon material and/or mixture and S400 can be performed a second time to cold-weld or fuse particles from the first instance of S400. In another example, S400 can be performed a first time before S200 and a second time after S200 or S300 (e.g., to cold-weld or fuse silicon material with sacrificial material removed). However, multiple instances of S400 can be performed in any manner.

In some variations, S400 can include coating the silicon material and/or mixture. Additionally or alternatively, the method can optionally include coating the silicon material S500 as a separate step (e.g., performed before during or after S100, performed before during or after S200, performed before during or after S300, performed before during or after S400, etc.). For example, a coating material can be added at the same time the silicon material and/or mixture is comminuted where the coating material can be activated and/or coat the silicon material and/or mixture. In another example, a coating can be grown on (e.g., via chemical vapor deposition) the silicon material and/or mixture (where contemporaneous comminution can be beneficial for moving the silicon material and/or mixture enabling more homogeneous coating).

The coating material preferably includes carbon, but can include any suitable materials (e.g., lithium). Examples of coating materials include: carbon (e.g., amorphous carbon), graphite, graphene, polymers (e.g., PAN, SBR, phenolic resin, nylon, polyurethane, sucrose, glucose, lactose, fructose, CMC, PAA, PVA, PVP, PEO, PPY, etc.), carbon nanotubes, fullerenes, carbon nanoribbons, and/or any suitable coating material.

In some variants, the coating material (particularly polymers) can be carbonized (e.g., pyrolyzed). For instance, a silicon material and/or mixture that is coated with a polymer can be heated to or above a decomposition temperature of the polymer to convert the polymer to elemental carbon (and water, oxygen, hydrogen, and/or other byproducts). In specific examples of carbonization, a fiber-like coating can be formed. The pyrolyzed carbon can increase and/or decrease a surface area of the silicon material and/or mixture. For instance, polymers, such as phenolic resin, that undergo shrinking or cyclization typically reduce the specific surface area of the silicon material and/or mixture, whereas polymers that do not undergo shrinkage can increase the specific surface area of the silicon material and/or mixture (e.g., by making the carbon coating porous).

In a specific example, the silicon material and/or mixture can be coated and/or include a coating as disclosed for example in U.S. patent application Ser. No. 17/890,863 titled 'SILICON MATERIAL AND METHOD OF MANUFACTURE' filed 18 Aug. 2022 which is incorporated in its entirety by this reference. However, the silicon material and/or mixture can include any suitable coating and/or be coated in any suitable manner.

The methods of the preferred embodiment and variations thereof can be embodied and/or implemented at least in part as a machine configured to receive a computer-readable medium storing computer-readable instructions. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for manufacturing a porous silicon material comprising:
    melting a composite comprising silicon, carbon, and a first sacrificial element;
    directionally solidifying the composite such that two phases, a first sacrificial element rich phase that comprises more of the first sacrificial element than silicon and a silicon rich phase that comprises more silicon than the first sacrificial element, are formed, wherein the two phases form a lamellar or a rod-like structure;
    removing the first sacrificial element rich phase to form the porous silicon material;
wherein after removing the sacrificial element rich phase, the porous silicon material comprises between 1-5% carbon by mass, at least 80% silicon by mass, and a porosity between 10-50% by volume.

2. The method of claim 1, wherein the composite comprises a second sacrificial element, different than the first sacrificial element, wherein the method further comprises during or after removing the first sacrificial element rich phase, etching the second sacrificial element, wherein the porous silicon material comprises:
    a first pore distribution comprising pores aligned along a shared axis with a diameter between about 100 and 500 nm; and
    a second pore distribution comprising pores with a substantially random spatial distribution with a diameter between about 0.2 nm and 10 nm.

3. The method of claim 2, wherein silicon forms a eutectic mixture with the first sacrificial element.

4. The method of claim 1, further comprising cold welding the porous silicon material to form a sealed surface, wherein pores of the porous silicon material are retained within the sealed surface.

5. The method of claim 1, further comprising coating the silicon material with a carbonaceous coating by:
injecting a polymer into pores of the silicon material; and
pyrolyzing the polymer to form carbon.

6. The method of claim 1, further comprising forming the composite by heating the silicon, carbon, and the first sacrificial element to a temperature between about 300-1100° C. for between 1 and 6 hours.

7. The method of claim 1, pulverizing the composite by ball milling the composite at a milling rate between about 50 and 300 rpm for between 30 minutes and 6 hours.

* * * * *